United States Patent [19]

Schramm

[11] Patent Number: 5,358,084
[45] Date of Patent: Oct. 25, 1994

[54] TORQUE MAGNITUDE CONTROL USING ELECTRORHEOLOGICAL FLUIDS

[75] Inventor: Scott W. Schramm, Novi, Mich.

[73] Assignee: Chrysler Corporation, Highland Park, Mich.

[21] Appl. No.: 5,820

[22] Filed: Jan. 19, 1993

[51] Int. Cl.$^5$ .................... F16D 27/00; B60K 41/02
[52] U.S. Cl. ................... 192/21.5; 180/197; 477/175
[58] Field of Search .............. 192/21.5, 103 F, 0.032, 192/0.033, 0.034, 0.096, 0.098, 58 R; 180/197, 248

[56] References Cited

U.S. PATENT DOCUMENTS

| | | | |
|---|---|---|---|
| 2,886,151 | 5/1959 | Winslow | 192/21.5 |
| 3,150,678 | 9/1964 | Nuber | 192/21.5 X |
| 3,255,853 | 6/1966 | Klass et al. | 192/21.5 |
| 4,444,298 | 4/1984 | Stangroom | 192/21.5 |
| 4,782,927 | 11/1988 | Sproston et al. | 192/21.5 |
| 4,895,217 | 1/1990 | Hueckler et al. | 180/248 X |
| 4,896,752 | 1/1990 | Shtarkman . | |
| 4,896,754 | 1/1990 | Carlson et al. . | |
| 4,920,929 | 5/1990 | Bishop | 192/21.5 X |
| 4,926,329 | 5/1990 | Stelter et al. | 180/248 X |
| 5,007,303 | 4/1991 | Okuzumi | 192/21.5 X |
| 5,012,740 | 5/1991 | Hardt . | |
| 5,020,622 | 6/1991 | Hrovat | 180/197 |
| 5,029,823 | 7/1991 | Hodgson et al. . | |
| 5,050,850 | 9/1991 | Noguchi et al. . | |
| 5,088,703 | 2/1992 | Takano et al. . | |
| 5,090,531 | 2/1992 | Carlson | 192/21.5 |
| 5,099,884 | 3/1992 | Monahan . | |
| 5,123,348 | 6/1992 | Henson | 192/21.5 X |

OTHER PUBLICATIONS

Electrorheological Fluids and Devices, "Automotive Engineering", Dec., 1988, vol. 96, No. 12, pp. 45–48 By Theodore G. Duclos.

Shock Absorber Uses Electrorheological Fluid, "Automotive Engineering", Jun. 1992, vol. 100, No. 6, pp. 27–30, By Nicholas K. Petek.

Primary Examiner—Rodney H. Bonck
Attorney, Agent, or Firm—Mark P. Calcaterra

[57] ABSTRACT

A device for controlling the magnitude of torque transmitted from a torque supply source to an output drive device utilizing a contained electrorheological fluid medium. A pair of wetted surface plates, each operably connected to one of the supply and drive device via a shaft, are immersed in the fluid medium. Electrical energy is applied to the fluid to cause a pseudo-solid to form between the plates thereby facilitating the transmission of torque.

9 Claims, 2 Drawing Sheets

TORQUE MAGNITUDE CONTROL USING ELECTRORHEOLOGICAL FLUIDS

BACKGROUND AND SUMMARY OF THE INVENTION

This invention relates generally to methods of torque transmission and, more particularly, to an electrorheological fluid coupling for controlling the magnitude of torque delivered from an input torque supply to an output drive device.

The principle of torque transmission control fundamentally involves the concept of controllably changing the torque-speed ratio or mechanical advantage between a rotating input shaft and a rotatable output shaft. In an automotive setting, this concept is most notably used in an automotive transmission, a device which transmits engine rotation and power to the drive wheels at various ratios. The main function of the transmission is to enable the vehicle to accelerate from a standstill to maximum speed through selected gear ratios while the engine continuously operates within its most effective and efficient range.

Traditionally, the magnitude of torque delivered from a torque supply source to a final drive device has been controlled through the use of mechanical or frictional braking or by simply controlling the rotational speed of the motor or engine. More recently, viscoelastic fluids have also been utilized to controllably transfer torque. In these fluid-based systems, a pair of wetted surface plates, one connected to the torque supply source by a torque input shaft and the other connected to the drive device by an output shaft, are immersed in a viscoelastic fluid medium. The viscous properties of the fluid cause a "fluidic couple" to form as a pseudo-solid between the two wetted surface plates. This couple facilitates torque transmission between the plates by forcing the plate attached to the output shaft to rotate in response to a rotation of the plate adjoining the rotating input shaft. This ultimately results in the transfer of torque from the supply to the final drive device and is the basic operating principle behind the viscous coupled transmission or transfer case.

While viscoelastic fluids have provided some distinct advantages over more conventional mechanical and rotational mechanisms for torque transmission control, there are several inherent difficulties in this type of system. With normal viscoelastic fluids, torque transmission between the wetted plates is governed solely by the viscoelastic properties or the medium. Normal viscoelastic fluids have a very fixed relationship between their rheological properties and various environmental parameters. At any given temperature, the viscosity, coherence and maximum sheer coefficients of the fluid will be constant. However, as temperature increases, usually due to friction or interstitial molecular dynamics (shear thinning within the fluid), the torque transmission efficiency of the viscoelastic fluid normally declines due to reduced coherence and/or viscosity. The net result is usually increasing "fluid slip", eventually to the point where the pseudo-solid cracks or fractures, resulting in torque transmission pulsing or cessation.

The present invention attempts to provide an improved torque transmission control system by defining a fourth mechanism of torque magnitude control utilizing an electrorheological fluid coupling. Electrorheological fluids are suspensions which exhibit a change in their flow characteristics and viscosity upon the application of an electric charge or electric field. With these fluids, the relationship between rheological and environmental parameters can be more precisely controlled over a specific bandwidth of operating conditions than with normal viscoelastic fluids.

Through the generation of a variable electric charge or field by the application of an electrical current or voltage to the fluid, the rheological properties of the electrorheological fluid are precisely controllable. This enables constant and semi-infinite torque magnitude control over wide ranges of rotational speeds, input torque magnitudes and operating parameters. By controllably altering the amount of electrical energy applied to a contained electrorheological fluid medium in which a pair of wetted surface plates are immersed, the system of the present invention controls the magnitude of torque transmitted between these plates and, ultimately, from a torque supply to a final drive device, in a manner not heretofore possible with ordinary viscoelastic fluids.

Additional advantages and features of the present invention will become apparent to one skilled in the art from the following description and claims, taken in conjunction with the accompanying drawings.

DETAILED DESCRIPTION OF THE PREFERRED EMBODIMENTS

Figure 1:
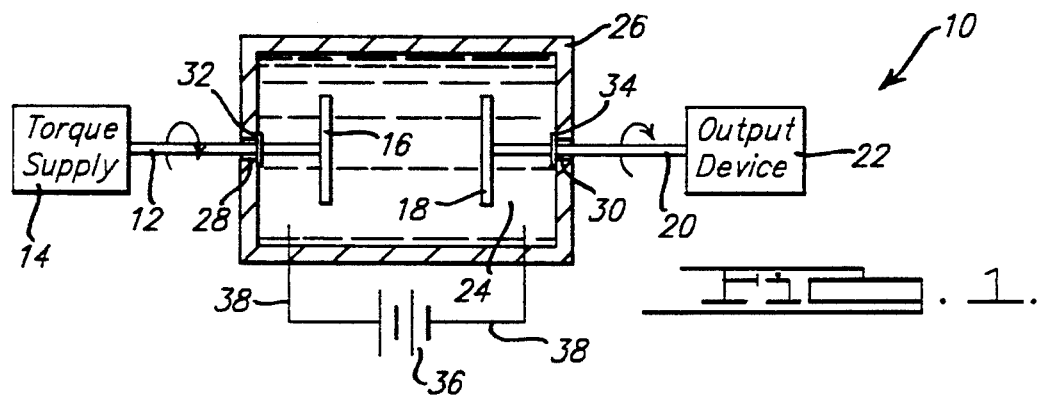
FIG. 1 is a block diagram of the torque magnitude control system of the present invention in its simplest form.

Referring now to the drawings, the torque magnitude control system of the present invention is illustrated generally at 10 in FIG. 1. A torque input shaft 12 rotates under the influence of a torque supply device 14 such as an electric motor, internal combustion engine or wind turbine. The speed and horsepower of the rotary excitation device of torque supply 14 determine the magnitude of torque transmitted along the input shaft 12, less any losses occurring due to friction or interstitial material mechanics.

The torque input shaft 12 is mechanically connected to a first wetted surface plate 16. Rotation of input shaft 12 causes rotation of first wetted surface plate 16 at a speed which is essentially equivalent to the speed of rotation of input shaft 12 since they are mechanically mated. This mechanical mating may be by common material (machined from a common piece of stock), welding, spline or any other suitable method. A second wetted surface plate 18 is mechanically connected by a torque output shaft 20 to the final output drive device 22. Output shaft 20 is preferably affixed to second wetted surface plate 18 and output drive device 22 in the same manner as input shaft 12 connects to plate 16 and torque supply 14.

Both the first and second wetted surface plates, 16 and 18, are preferably circular in cross section and are immersed in an electrorheological fluid medium 24 which is restricted by the internal boundaries of an electrorheological fluid medium container 26. Container 26 preferably is of circular cross section corresponding substantially in size to the cross sectional size of wetted surface plates 16 and 18. The size of container 26, plates 16 and 18 and the volume of fluid 24 are determined based upon the specific properties of the fluid as well as the performance specifications of the desired device.

Input shaft 12 and output shaft 20 pass through corresponding and preferably axially-aligned circular openings 28 and 30, respectively, in container 26. Seals 32 and 34, preferably annular rotating seals, are also preferably placed between the torque input and output shafts, 12 and 20, and the electrorheological fluid medium container 26 to prevent leakage of the fluid medium 24 therefrom. A source of electric energy 36, such as a battery or generator, is also provided as a means of inducing an electric charge or field through the fluid medium 24 by the application of electrical energy in the form of a current or voltage. Also provided are means of electrically connecting the power source 36 to the fluid medium 24, such as insulated wires 38. Wires 38 act as an anode/cathode pair to create a charge in the fluid medium 24 therebetween. These wires preferably pass sealably through corresponding openings in container 26 directly into the fluid medium 24.

Due to the cohesive and frictional properties of the electrorheological fluid medium 24, there exists surface boundary attraction and retention between wetted surface plates 16 and 18 and the electrorheological fluid medium 24. The electrorheological fluid medium 24 has viscoelastic properties which cause it to act as a pseudo-solid under specific environmental and mechanical conditions. When input shaft 12 is rotating and electrical energy is applied to the fluid medium 24, a fluidic "couple" forms as a pseudo-solid cylinder between the wetted surface plates 16 and 18. This couple provides torque transmission between the wetted surface plates and from the torque input shaft 12 to the torque output shaft 20. Ultimately, torque produced by torque supply 14 is thereby transferred to the final output drive device 22. The precise magnitude of torque transferred is variably controlled by the viscous state of the fluid and therefore the relative strength of the electric charge induced therein.

Through the controlled application of electrical energy from energy source 36 to the fluid medium 24, the rheological parameters of the electrorheological fluid can be maintained at a near constant level. The viscosity, coherence and shear coefficients can therefore be held near constant over a predetermined bandwidth of external parameters simply by adjusting the current flow or voltage applied to the fluid. The net effect is near constant torque transmission efficiency and magnitude control over a specified application bandwidth.

Similarly, by manipulating the strength of the electric charge induced in the fluid medium 24 by energy source 36, the viscosity, coherence and shear coefficient of the fluid can be controllably altered to effect a semi-infinite range in the magnitude of torque transmitted. This further enables a unique application of the torque control mechanism of the present invention as a torque transmission "fuse". This second embodiment of the present invention as a torque fuse is indicated generally at 40 in FIG. 2.

In an automotive setting, this "fuse" embodiment of the present invention can be used to provide powertrain protection by modulating and or ceasing torque transmission during operating conditions likely to cause damage to various powertrain components. By combining an electronic logic control circuit with the electrorheological fluid torque couple disclosed above, this system can be used in combination with a mechanical device such as a mechanical transfer case, gear reducer or transmission, in combination with a viscoelastic fluid device such as a viscous coupled transfer case or transmission, or as a replacement for one or more of these devices.

In this embodiment, a torque input shaft 42 rotates under the influence of a torque supply source 44 such as a motor or turbine. The speed and horsepower of the torque supply source 44 determines the magnitude of torque transmitted along the input shaft 42, minus any transmission losses occurring as a result of friction or interstitial material mechanics. The torque input shaft 42 connects to a electrorheological fluid couple 46, essentially the same combination of wetted surface plates, fluid medium, fluid medium container and source of electrical energy defining the fluid couple in FIG. 1.

Fluid couple 46 on the side thereof opposite input shaft 42 is also mechanically connected to torque transmission shaft 48. Shaft 48, on the side opposite couple 46, is connected to a sensor 50 which is further connected to torque transmission shaft 52. Sensor 50 preferably measures the rotational speed and/or torque of shaft 48 and outputs an electronic signal indicative of that measurement. Sensor 50 may be either passive, in that it simply measures torque and/or speed, or else active, in that it transmits torque as well as measures torque and/or speed. Shaft 52 is operably connected to the final output drive device 54 and, combined with shaft 48, cooperate to form the "output shaft" of device 40.

An electronic control unit (ECU) 56, preferably a digital microprocessor, is electrically coupled via electrical connections 58 and 60 both to fluid couple 46 and to sensor 50. ECU 56 is preferably electrically coupled to the electrical energy source connected to the fluid medium of torque couple 46 so as to be able to precisely influence the amount of electrical energy supplied to the fluid. The electronic logic control circuit 62, used to facilitate the "fuse" embodiment of the present invention, includes fluid couple 46, sensor 50, ECU 56 and the interconnected shafts and electrical connections.

Rotation of the excitation device of the torque supply 44 causes rotation of the input shaft 42. The desired efficiency of torque, rotational speed and resultant power transmitted from input shaft 42 by the fluid couple 46 may be determined based upon various application requirements. This efficiency is controllable or maintainable within a specific application bandwidth by closely controlling the magnitude of the current or voltage applied to the electrorheological fluid.

The electronic logic control circuit operates as a closed loop feedback system which includes a sensor (torque/speed sensor 50), a comparator (ECU 56) and a device for effecting control (fluid torque couple 46). The sensor 50 converts the torque and/or rotational speed of output shaft 52 into a representative electronic signal. This electronic signal is transmitted to ECU 56 via electrical connection 60. Depending upon the type and requirements of the sensor 50, the ECU 56 may also be configured to provide electrical signals to sensor 50, also via electrical connection 60.

The fuse capability of the device 40 results from the combination of electronic logic control and the unique physical and mechanical fluid property relationship to voltage or current. Under specific conditions, an electrorheological fluid can range from a high viscosity pseudo-solid to a low viscosity liquid. In the pseudo-solid form, the fluid can transmit torque between adjacent wetted surface plates and therefore between the input and output shafts. In its low viscosity form, however, the fluid may permit rotation of one plate without causing rotation of the other plate, thereby failing to transmit torque. Between these two extremes, though, the fluid properties and its torque transmission capability is semi-infinitely variable. Because of this, the fuse can be set up to operate in either a "conditional" or an "absolute" mode.

In the "conditional" mode, the electronic logic control circuit attempts to maintain full or partial power transmission throughout a transient event by modulating the efficiency of the torque control. In the "absolute" mode, the electronic logic control circuit ceases power and torque transmission by zeroing out the efficiency of the torque control by discontinuing the application of an electric field to the fluid medium causing a dramatic decrease in the viscosity of the fluid.

Within the ECU 56, the electronic signal provided by sensor 50 is analyzed and compared with a preprogrammed set of values corresponding to "acceptable", "marginal" and "unacceptable" conditions of operation, these values preferably stored in an internal memory of ECU 56. As long as the signal remains within the acceptable operating range, the ECU 56 maintains the present voltage or current magnitude applied to the fluid torque couple 46 through electrical connection 58. If, however, the electronic signal output from sensor 50 changes into what has been mapped as a "marginal" operating condition, the ECU 56 can either attempt to modulate the current or voltage applied to the fluid couple 46 to maintain all or a portion of the torque transmission, or, alternately, reduce the magnitude of the voltage or current applied to the fluid couple 46 to a point where torque transmission ceases.

The control decision of the ECU 56 is preferably made based upon the damage potential of the transient event from perceived anticipated functional characteristics of the transient. These functional characteristics of the transient could include any of the following, either singly or in combination: a speed fluctuation pulse, a torque fluctuation pulse, a dynamic vibration condition, an electrical system default or a timing mark such as a specific number of hours of continuous operation after which a maintenance function is required.

If the electrical signal output from sensor 50 then ultimately changes into one mapped to an unacceptable operating condition, the ECU 56 responds by immediately changing the voltage or current applied to fluid torque couple 46 such that torque transmission from input shaft 42 to output shaft 52 completely ceases. In this "unacceptable" operating condition scenario, the torque couple 46 functions as a fuse to the powertrain system by completely and immediately interrupting the transmission of torque and perhaps saving downstream components from damage or destruction.

A particularly attractive feature of the torque fuse of this embodiment is that it does not require manual interaction or replacement to be reset. This is more convenient than electrical or mechanical types of fuses which have to be manually or mechanically replaced or reset. The fluid torque couple based fuse of the present invention, in contrast, is resettable electronically when the system is restarted under "acceptable" operating conditions. Upon receipt by the ECU 56 of a signal from sensor 50 indicative of acceptable operating conditions, ECU 56 changes the magnitude of the voltage or current applied to the electrorheological fluid of the torque couple 46, and thereby re-establishes the transmission of torque.

In addition to this fuse function, the second embodiment of the present invention can be utilized in a "feather-in/feather-out" mode. This feature could be used when high rotational speeds or high magnitude torques are to be transmitted by the powertrain to or from rest. The powertrain could be brought up to speed or down to speed along a respective predetermined acceleration or deceleration curve which would minimize potential transient or shock damage to the powertrain components. The data to control this process would preferably be preprogrammed into ECU 56. Moreover, the ECU 56 could also be connected to the torque supply source 44 to additionally and simultaneously control its operating parameters.

The primary advantage gained with the above described system is powertrain protection through the modulation or cessation of torque transmission based upon a current measured operating condition of the system. A second advantage is powertrain adaptation and torque control precision gained through the use of a logic control circuit responsive to the sensed operating condition. Finally, the elimination of the need for replacing or resetting a physical fuse or circuit breaker is achieved since the electrorheological fluid medium can be re-parameterized by the selective application of voltage or current.

The above-described system based upon a fluid torque couple can additionally be further extended to include a third preferred embodiment of the present invention, a fluid torque couple based vehicle traction control system. In its simplest form, this concept is that of inserting the combination of the electronic logic control circuit and electrorheological torque couple disclosed above within the drivetrain/powertrain of a ground vehicle for achieving traction control through torque transmission and magnitude control.

Within the context of a ground vehicle, such as an automobile or truck, torque magnitude and transmission control is embodied by slip/traction control at the road and tire interface. Current state of the art vehicle ground traction is through the antilock braking system (ABS). But, whereas ABS is imparted to the vehicle when in deceleration, traction control is imparted when the vehicle is in acceleration.

Figure 3:
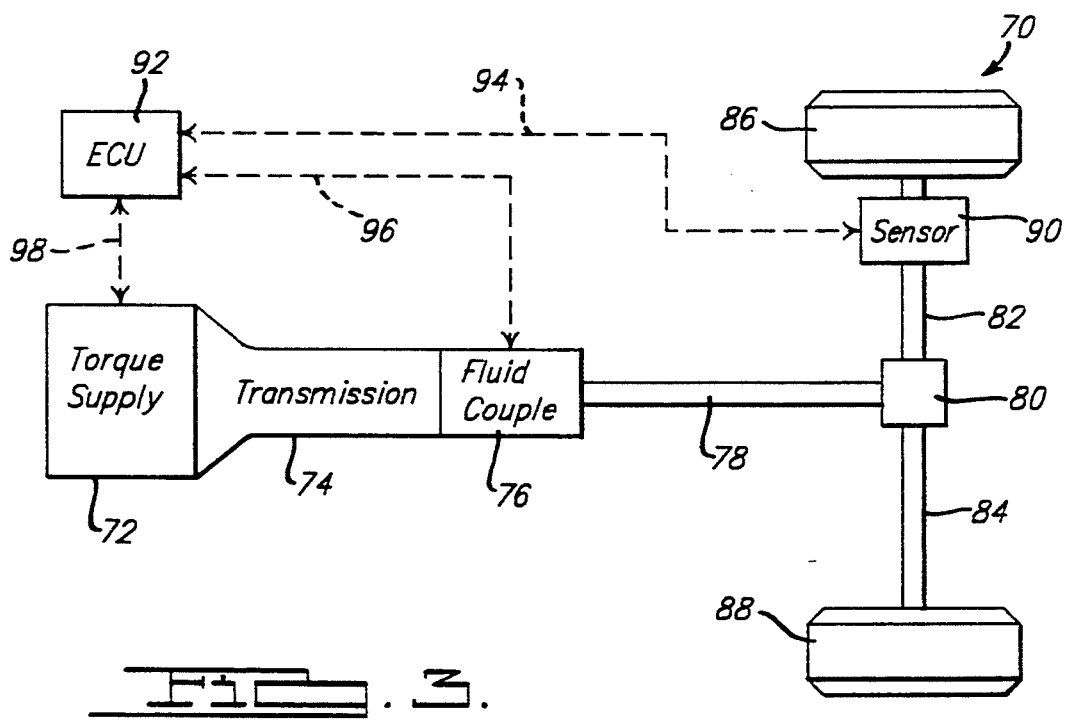
FIG. 3 is a block diagram illustrating yet another embodiment of the present invention wherein the torque transmission control system of the present invention is applied to a ground vehicle traction control system.

The traction control system of the present invention is indicated generally at 70 in FIG. 3. In this system, a torque supply source 72 is controlled by the vehicle operator through some type of throttle (not shown). This throttle governs the rotational speed of torque supply source 72 as input into a transmission 74. The torque and power imparted to the transmission is a function of the design parameters of torque supply source 72. The transmission 74 increases or decreases the rotational speed imparted by supply source 72 based on application requirements. In current ground vehicles, the transmission is usually one of two different types inline or transverse. In an inline transmission the input and output shafts are parallel or concentric to each other. In a transverse transmission, these shafts are instead perpendicular to each other. While FIG. 3 shows the present invention embodied in a vehicle having an inline transmission, it should be clear to one skilled in the art that this invention is equally applicable to one having a transverse transmission with only slight variation. Also, it should be noted that the present invention can be used in conjunction with vehicles having either a manual or automatic gear shifting operation.

In the configuration of FIG. 3, transmission 74 is connected as an input to a fluid torque couple 76, again of the same type as illustrated in FIGURE 1 and including a pair of wetted surface plates immersed in a contained electrorheological fluid medium. Couple 76 is also connected to a propshaft 78 which in turn is mechanically coupled to an axle differential 80. Differential 80 is then coupled to axles 82 and 84, each connected to one of the vehicle's road wheels 86 and 88, respectively. Disposed along or within axle 82 is a sensor 90 for measuring the rotational speed and/or torque of shaft 82. This sensor can either be "passive" in that it does not transmit torque or "active" in that it transmits torque. A torque sensor is often inline and transmits torque in addition to quantifying transmitted torque magnitude while a rotational speed sensor often reads a tone wheel which rotates with the end of the axle shaft 82 or road wheel 86.

Sensor 90 is electrically connected to an electronic control unit (ECU) 92 via electrical connection 94. ECU 92 is also preferably electrically connected to the electrical energy supply source of fluid couple 76 via electrical connection 96 as well as to torque supply 72 via connection 98. Transmission 74 may be connected to the torque fluid couple 76 either directly (as shown) or indirectly through an intermediate torque transfer shaft (not shown).

Figure 2:
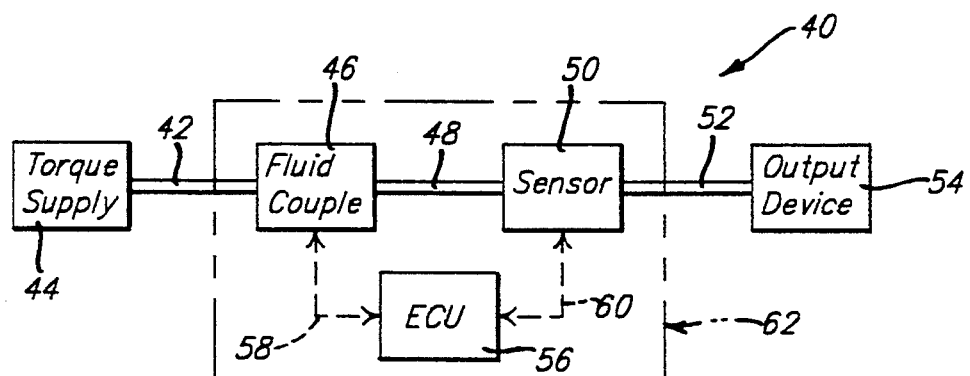
FIG. 2 is a block diagram of the torque magnitude control system of the present invention in an alternate embodiment wherein an electronic control circuit is added to create an electrorheological torque transmission "fuse".

Traction control device 70 operates in a manner substantially like the fuse embodiment 40 shown in FIG. 2. The major difference, however, is that the ECU 92 internal memory is instead mapped with traction control comparative parameters. In real time, the ECU 92 reads, analyzes and maps the output signal from the torque/speed magnitude sensor 90 against values corresponding to preprogrammed acceptable and unacceptable operating conditions of the vehicle.

If a given sensed condition is within an acceptable range, and therefore traction is at or near a maximum, ECU 92 maintains or slightly modulates the current or voltage transmitted to the fluid couple 96. This maintains the viscosity, coherence and shear parameters of the electrorheological fluid where it acts as a pseudo-solid and transmits torque. If an unacceptable condition is sensed, indicating that traction is rapidly decreasing or lost, ECU 92 changes the amount of current or voltage transmitted to the fluid to reduce the fluid's viscosity, coherence and shear parameters to a point where it transmits little or no torque. The road wheels 86 and 88 then reduce speed until traction is re-established as monitored by sensor 90 and ECU 92. As traction is re-established, ECU 92 adjusts the magnitude of the current or voltage applied to fluid couple 76 until normal traction control is indicated.

In this embodiment, it is preferable that ECU 92 also communicate in a closed logic loop with the vehicle's engine control unit and transmission control unit. The rationale behind this requirement is that if the fluid couple ceases or reduces torque transmission, the torque supply source and transmission will become "unloaded" and this could result in a speed or torque pulse which could damage either or both. In an integrated closed loop communication network, the ECU can warn the torque supply and transmission of the impending unloading of the fluid couple and lower the rotational speed of the torque supply source in advance of the torque transmission efficiency decrease. This is an example of the "feather-in/feather-out" concept discussed above.

Figure 4:
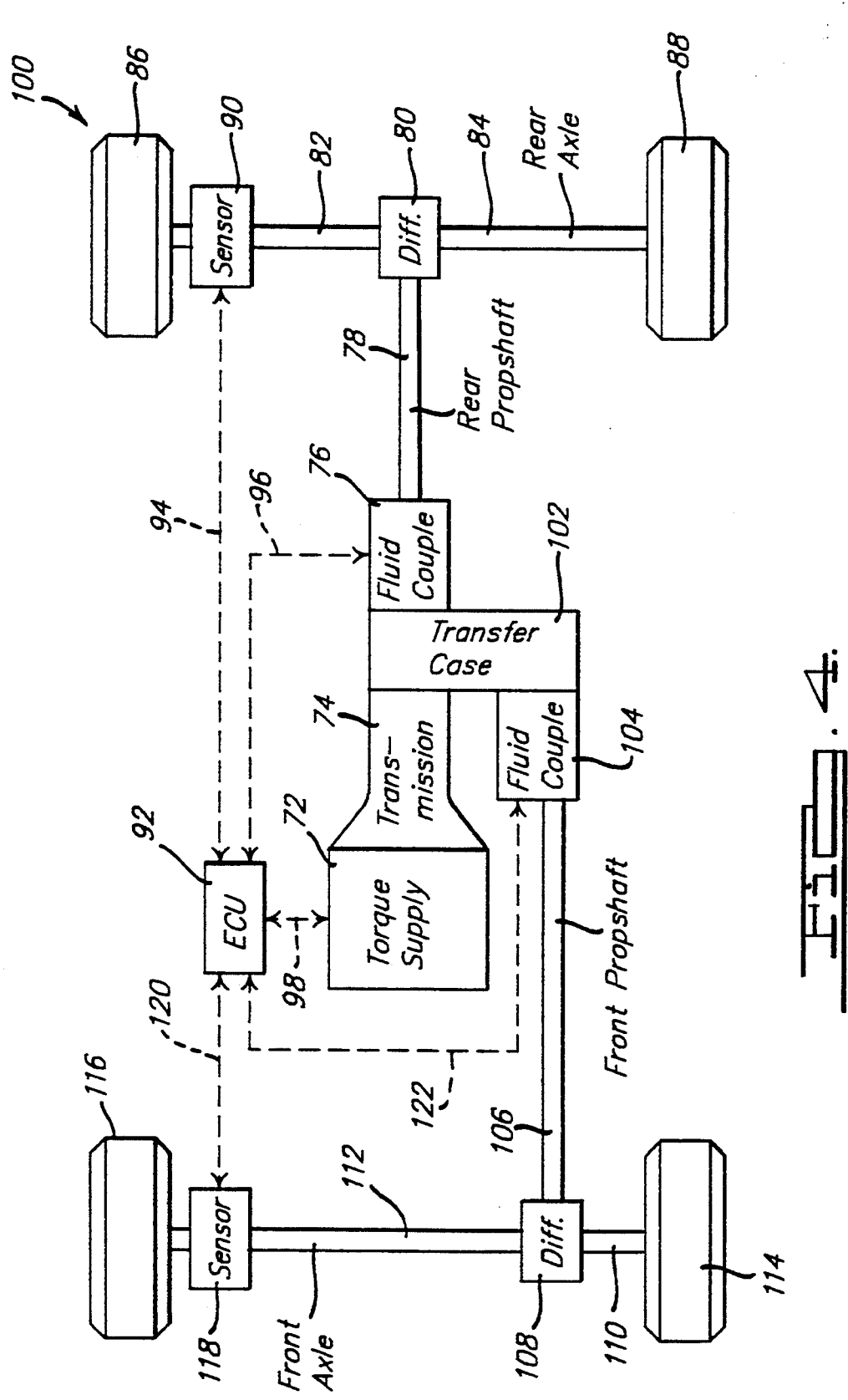
FIG. 4 is a block diagram of a ground traction control system similar to that of FIG. 3, embodied in a vehicle having four-wheel drive capability.

In the configuration illustrated in FIG. 3, there is a direct coupling between output shaft of the transmission 78 and the differential 80 of the drive axles 82 and 84. This direct coupling is through a single, direct or jointed propshaft 78. In the case of a transverse transmission, however, the differential of the drive axle is integral to the transmission, resulting in what is known as a transaxle. With a transaxle, the axle half shafts are the direct mechanical link between the transmission and the tire assemblies, replacing the single propshaft. In this case there is an intermediate device between the transmission and the axle differentials. This intermediate device is known as a transfer case and is used for multi-wheel driven vehicles. The most popular and widely known version of multi-wheel drive is 4 Wheel Drive (4WD). The device 70 is readily adaptable to a vehicle having a transaxle configuration as illustrated generally at 100 in FIG. 4.

To accomplish this, a traction control system substantially like that of FIG. 3 is utilized, except that a transfer case 102 is implemented between transmission 74 and fluid couple 76. Transfer case 102 is operably connected to a second fluid couple 104 which connects to a second propshaft 106, in this case a front propshaft, which is also coupled to a front axle differential 108. The transfer case splits the torque and rotation output by the transmission through the two propshafts to the front and rear axle differentials. Front axle differential 108 is coupled to front axles 110 and 112, each connected to road wheels 114 and 116, respectively, just as in the rear. Disposed along or within at least one of front axles 110 and 112 is an additional torque/rotational speed sensor 118, similar to sensor 90. Sensor 118 connects through electrical connection 120 to ECU 92 to transmit rotational speed and/or torque measurements for processing. Additionally, fluid couple 104 is likewise coupled to ECU 92 via electrical connection 122.

In this embodiment ECU 92, based on measurements from sensors 90 and 118, individually controls the precise amount of electrical energy provided to the electrorheological fluid in each of fluid couples 76 and 104, to thereby controllably vary the magnitude of torque transmitted by each fluid couple. Like the two wheel drive embodiment of FIG. 3, ECU 92 reads, analyzes and maps the output signals from the torque/speed sensors against values corresponding to preprogrammed acceptable and unacceptable operating conditions of the vehicle.

While the foregoing discussion discloses and describes merely exemplary embodiments of the present invention, one skilled in the art will readily recognize from such discussion, and from the accompanying drawings, that various changes and modifications can be made therein without departing from the spirit and scope of the following claims.

I claim:

1. A vehicle ground wheel traction control system comprising:
   a torque supply source;
   an axle differential;
   a pair of axle drive shafts, said axle differential being mechanically coupled between said drive shafts;
   (a) a fluidic coupling device comprising:
      (i) a torque input shaft connected directly to said torque supply source, said input shaft rotatable under the influence of said torque supply source;
      (ii) a torque output shaft connected directly to said axle differential;
      (iii) a first wetted surface plate operably connected to said input shaft so as to rotate with said input shaft;
      (iv) a second wetted surface plate operably connected to said output shaft wherein rotation of said second wetted surface plate is adapted to cause rotation of said torque output shaft;
      (v) a container means for containing an electrorheological fluid medium, said container means also housing said first and second wetted surface plates;
      (vi) a source of electrical energy; and
      (vii) a means for applying a variable amount of electrical energy supplied by said source of electrical energy to said electrorheological fluid medium;
   (b) sensor means for measuring at least one of the rotational speed and torque of at least one of said axle drive shafts; and
   (c) control means operably connected to said sensor means and said means for applying electrical energy for controlling the amount of said electrical energy applied to said fluid in response to said sensor measurement to variably control rotation of said second wetted surface plate in response to a rotation of said first wetted surface plate.

2. The system of claim 1 wherein said control means includes a digital microprocessor.

3. The system of claim 1 wherein said control means includes a memory means for storing a set of preprogrammed values and wherein said control means compares said measurement from said sensor means to said preprogrammed values and wherein said preprogrammed values correspond to measurements by said sensor means indicative of acceptable and unacceptable operating conditions.

4. The system of claim 3 wherein said control means causes a decrease in the amount of electrical energy applied to said fluid when said measurement corresponds to a preprogrammed value indicative of an unacceptable operating condition and wherein said control means maintains a constant amount of electrical energy applied to said fluid when said sensor measurement corresponds to a preprogrammed value indicative of an acceptable operating condition.

5. A four wheel drive vehicle traction control system comprising:
   a torque supply source;
   front and rear axle differentials;
   front and rear axle drive shafts coupled to respective of said front and rear axle differentials;
   (a) a front fluidic coupling device and a rear fluidic coupling device, each device comprising:
      (i) a torque input shaft;
      (ii) a torque output shaft connected directly to a respective one of said front and rear axle differentials:
      (iii) a first wetted surface plate operably connected to said input shaft so as to rotate with said input shaft;
      (iv) a second wetted surface plate operably connected to said output shaft wherein rotation of said second wetted surface plate is adapted to cause rotation of said torque output shaft;
      (v) a container means for containing an electrorheological fluid medium, said container also housing said first and second wetted surface plates, said electrorheological fluid forming a fluid coupling between said first and second wetted plates to transmit torque from said input shaft to said output shaft;
      (vi) a source of electrical energy; and
      (vii) a means for applying a variable amount of electrical energy supplied by said source to said electrorheological fluid medium, said fluid having properties responsive to said amount of electrical energy to control rotation of said second wetted surface plate in response to a rotation of said first wetted surface plate;
   (b) a transmission operably connected to said torque supply source;
   (c) a transfer case operably coupling said transmission to the input shaft of each of said fluidic coupling devices;
   (d) front and rear sensor means for measuring at least one of the rotational speed and torque of said front and rear axle driveshafts; and
   (e) a control means operably connected to said first and second fluidic couplings and to each of said sensor means, said control means controlling the amounts of said electrical energy applied to said electrorheological fluid medium in each said fluidic coupling device in response to said sensor measurements.

6. The system of claim 5 wherein said control means is a digital microprocessor electrically connected to each of said sensing means and said fluidic couplings, said microprocessor including memory means for storing a set of preprogrammed values wherein said microprocessor compares said sensor measurements to said preprogrammed values.

7. The system of claim 6 wherein said preprogrammed values correspond to measurements by said sensing means indicative of acceptable and unacceptable operating conditions.

8. The system of claim 7 wherein said control means causes a decrease in the amount of electrical energy applied to said fluid in at least one of said fluidic coupling devices when a respective of said sensor measurements corresponds to a preprogrammed value indicative of an unacceptable operating condition, said energy being decreased to a point wherein said fluidic coupling transmits little or no torque.

9. The system of claim 8 wherein in response to a sensor measurement indicative of an acceptable operating condition, said control means adjusts the amount of electrical energy applied to said fluid to maintain said sensed acceptable operating condition.

* * * * *